E. R. MURRAY.
TEMPERATURE INDICATOR.
APPLICATION FILED MAY 12, 1913.

1,097,348.

Patented May 19, 1914.

Witnesses
Frank H. Harter
F. A. Stock

Inventor
Edwin R. Murray

By
Harry Schroeder
Attorney

UNITED STATES PATENT OFFICE.

EDWIN R. MURRAY, OF ALAMEDA, CALIFORNIA.

TEMPERATURE-INDICATOR.

1,097,348.    Specification of Letters Patent.    Patented May 19, 1914.

Application filed May 12, 1913. Serial No. 767,032.

*To all whom it may concern:*

Be it known that I, EDWIN R. MURRAY, a citizen of the United States, residing at Alameda, in the county of Alameda and State of California, have invented certain new and useful Improvements in Temperature-Indicators, of which the following is a specification.

This invention relates to temperature indicators and has for its object the production of simple and efficient means whereby the temperature of a room or other place may be read at any distance from the thermometer.

Other objects and advantages of the present invention will appear throughout the following specification and claims.

Figure 1:
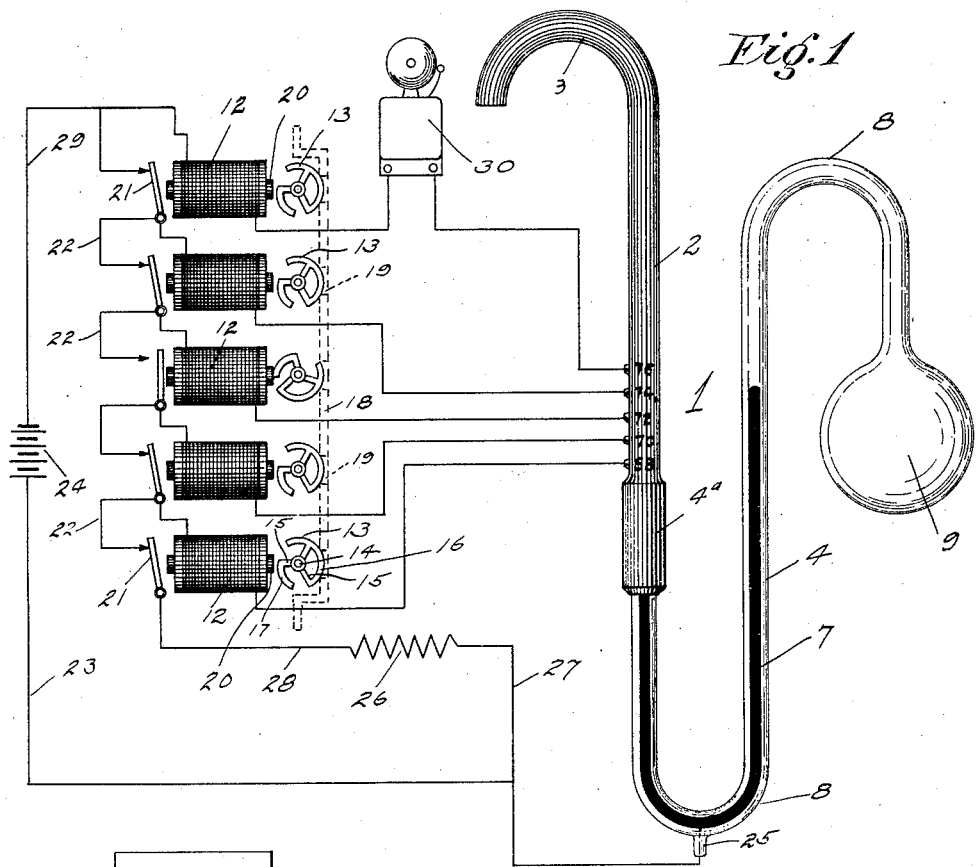
Figure 2:
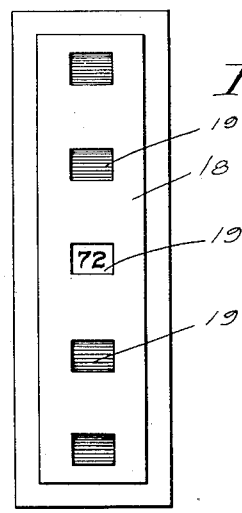
Figure 3:
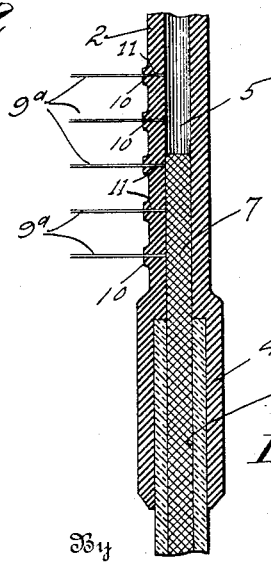

In the drawings:—Figure 1 is a side elevation of the thermometer and electrical circuit. Fig. 2 is a front view of the indicator box. Fig. 3 is a fragmentary section of the thermometer tube.

By referring to the drawings it will be seen that 1 designates the thermometer which comprises an upper insulated section 2 composed of hard rubber or similar material terminating at its top end in a curved neck 3, the end of which is open to the atmosphere. The lower section of the thermometer comprises a glass tube 4 which glass tube has one end fitting in the bore 5 formed in the lower end of the rubber tube 2. The lower end of the tube 2 is somewhat enlarged as indicated at 4ᵃ so as to constitute an efficient reinforcement at the point where the glass tube fits into the rubber tube. This glass tube 4 is preferably cemented in the lower end of the tube 2 so as to hold the glass tube 4 in firm engagement with the rubber tube 2. The tube 4 is provided with a central bore 6 of the same diameter as the bore 5 of the tube 2, and it will therefore, be seen that the mercury 7 may travel from the bore 6 into the bore 5 and efficiently form a contact with the several contact wires hereinafter referred to. The tube 4 is formed so as to constitute a plurality of bent or crooked portions 5, and the outer end of the tube 4 terminates in an enlarged bulb 9 which constitutes an air chamber for the tube 4. As stated above, the main portion of the tube is filled with mercury 7 and a number of wires 9ᵃ are vulcanized into the tube 2 at points corresponding with the degrees of heat desired to be indicated. These wires project through the tube 2 to the bore 5 sufficiently to form an efficient contact with the mercury when the same rises within the tube 2. The tube 2 is provided with a plurality of enlarged portions 10 around the apertures 11 through which the wires 9ᵃ pass so as to form an efficient gripping means for connecting the wires to the tube 2.

A number of electromagnets 12 are employed which are connected to the wires 9ᵃ, and these magnets operate indicating shutters 13 which shutters are placed in front of the magnets 12. Each of these shutters comprises a pivotal point 14 from which are radiated spokes 15, two of which spokes carry the indicating segment 16 and the other spoke carries the armature segment 17 adapted to be attracted by the magnet 12. The outer face of the segment 16 is colored so as to have half of its face the same color as the board 18 whereas the other half of the indicator segment is painted white bearing a number corresponding with the temperature on the thermometer indicated by the segment operating through the different contacts which register with the different points upon the tube 2. The indicating board 18 is provided with a plurality of slots 19 through which may be viewed the indicating segments to allow the temperature to be read. Of course, the colors used upon the segments should be in contrast to each other so as to allow the segments to be easily read at a distance. The armature 17 of each indicator is attracted by the core 20 of the magnets 12 so that when the lower end of the armature 17 is in contact with the core 20 the segment 16 has rotated on its pivotal point until the figure on the segment is seen through one of the slots 19 formed in the indicator board or plate 18. A second armature 21 is carried near the opposite end of each magnet and is adapted to be attracted thereby, which will cause the armature 21 to break circuit with the lead wire 22. The opposite end of the lead wire 22 is in turn connected to the pivot point of the corresponding armature 21 of the succeeding magnet. The magnets 12 are, therefore, connected in series with the main lead 23 which main lead 23 is connected to a battery or other current furnishing means 24. The lead wire 23 terminates in a knob 25 in the bottom of the loop of the tube 4. If it is desired to run indicators on batteries of the closed circuit type, a resistance 26 is employed and may be placed in the circuit by connecting the lead wires 27 to the wire 23 and to the armature 21 of the lowest magnet by the lead wire 28. When used in this manner, the current will flow from the batteries 24 through the wires 23 and 27, resistance 26, wire 28, through the armatures 21, and wires 22 back to the batteries 24 through the wire 29 and those below it. The mercury 7 then rises in the tubes 2 and 5 until it touches one of the wires $9^a$. A circuit is then formed which actuates the indicating segment corresponding with the temperature reached. When a circuit is closed through one of the magnets 12, all the lower magnets are cut out and the current passes through the armatures 21 of all magnets except the one being actuated.

If it should be so desired, a bell 30 may be employed with any desired circuit, so that an audible signal is given to indicate some particular point of temperature.

What is claimed is:—

1. A circuit closure of the class described comprising a pair of tubes, one of said tubes formed of an insulated rubber and provided with a downwardly curved overhanging upper end, said overhanging upper end being open to allow the atmosphere to communicate with the interior of said insulated tube, a plurality of contact wires vulcanized in said insulated tube, said insulated tube provided with an enlarged lower end having a socket formed therein, mercury in the other tube, said mercury containing tube having one end fitting in said socket and provided with a central bore, said insulated tube provided with a central bore of the same diameter as the bore in said mercury containing tube, said mercury containing tube provided with a plurality of crooked portions, said mercury containing tube provided at its outer end with an enlarged bulb constituting an air chamber, and a contact wire secured to the lower end of said mercury-containing tube.

2. A temperature indicator comprising a transparent mercury containing tube having an enlarged air bulb at one end, said tube having an upper downwardly curved bend and a lower upwardly curved bend, a contact wire extending into the tube through the lower bend, an insulated tube having an enlarged socket at its lower end fitting over the transparent tube against the lower bend, the insulated tube having an upper down-turned end that is open to the atmosphere, contact wires extending into the insulated tube adjacent the end socket, and indicating means in circuit with the contact wires of the tubes.

In testimony whereof I affix my signature in presence of two witnesses.

EDWIN R. MURRAY.

Witnesses:
FRANK N. COOLEY,
S. C. LAW, Jr.